United States Patent
Ko et al.

(10) Patent No.: US 10,571,571 B2
(45) Date of Patent: Feb. 25, 2020

(54) METHOD AND APPARATUS FOR CONTROLLING TIME OF FLIGHT CONFIDENCE MAP BASED DEPTH NOISE AND DEPTH COVERAGE RANGE

(75) Inventors: Dong-Ik Ko, McKinney, TX (US); Nara Won, Irvine, CA (US); Debasish Nag, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1088 days.

(21) Appl. No.: 13/295,713

(22) Filed: Nov. 14, 2011

(65) Prior Publication Data

US 2012/0123718 A1     May 17, 2012

Related U.S. Application Data

(60) Provisional application No. 61/413,235, filed on Nov. 12, 2010, provisional application No. 61/413,247, filed on Nov. 12, 2010.

(51) Int. Cl.
    *G01S 17/36*      (2006.01)
    *G01C 3/00*      (2006.01)
    (Continued)

(52) U.S. Cl.
    CPC ............... *G01S 17/36* (2013.01); *G01C 3/00* (2013.01); *G01C 25/00* (2013.01); *G01S 17/89* (2013.01);
    (Continued)

(58) Field of Classification Search
    CPC ... G01B 7/00; G01B 7/14; G01B 9/00; G01B 11/00; G01B 11/14; G01B 21/00; G01B 21/16; G01C 3/00; G01C 3/02; G01C 25/00; G01D 7/00; G01D 9/00; G01D 18/00; G01D 18/008; G01D 21/00;
    (Continued)

(56) References Cited

U.S. PATENT DOCUMENTS

| | | | | | |
|---|---|---|---|---|---|
| 2,547,232 | A | * | 4/1951 | Schwartz | ............... G03B 13/20 356/3.1 |
| 3,381,516 | A | * | 5/1968 | Maples | ................... G01F 23/00 73/1.01 |

(Continued)

*Primary Examiner* — Eman A Alkafawi
(74) *Attorney, Agent, or Firm* — Ebby Abraham; Charles A. Brill; Frank D. Cimino

(57) ABSTRACT

A method and apparatus for fixing a depth map wrap-around error and a depth map coverage by a confidence map. The method includes dynamically determining a threshold for the confidence map threshold based on an ambient light environment, wherein the threshold is reconfigurable depending on LED light strength distribution in TOF sensor, extracting, via the digital processor, four phases of Time Of Flight raw data from the Time Of Flight sensor data, computing a phase differential signal array for fixed point utilizing the four phases of the Time Of Flight raw data, computing the depth map, confidence map and the average light signal strength utilizing the phase differential signal array, obtaining the dynamic confidence map threshold for wrap around error correction utilizing the average light signal strength, and correcting the depth map wrap-around error utilizing the depth map, the confidence map and the dynamic confidence map threshold.

7 Claims, 6 Drawing Sheets

(51) Int. Cl.
*G01C 25/00* (2006.01)
*G01S 17/89* (2020.01)
*G01D 18/00* (2006.01)
*G06F 17/40* (2006.01)
*G16Z 99/00* (2019.01)
*G06F 19/00* (2018.01)

(52) U.S. Cl.
CPC ............ *G01D 18/00* (2013.01); *G06F 17/40* (2013.01); *G06F 19/00* (2013.01); *G16Z 99/00* (2019.02)

(58) Field of Classification Search
CPC ... G01S 7/00; G01S 7/48; G01S 17/00; G01S 17/02; G01S 17/88; G01S 17/89; G01S 17/36; G06F 11/00; G06F 11/30; G06F 11/32; G06F 11/34; G06F 15/00; G06F 15/16; G06F 17/00; G06F 17/10; G06F 17/40; G06F 19/00

USPC ..... 73/1.01, 1.79, 1.81, 432.1, 865.8, 865.9, 73/866.3; 356/3, 3.01, 3.1, 3.13, 4.01, 356/5.01, 614; 702/1, 85, 94, 97, 127, 702/155, 158, 159, 182, 187, 189; 708/100, 105, 200

See application file for complete search history.

(56) References Cited

U.S. PATENT DOCUMENTS

| | | | |
|---|---|---|---|
| 7,268,858 B2* | 9/2007 | Kuijk et al. | 356/5.01 |
| 7,852,464 B2* | 12/2010 | Kuijk et al. | 356/5.01 |
| 2006/0000967 A1* | 1/2006 | Kuijk et al. | 250/221 |
| 2007/0296951 A1* | 12/2007 | Kuijk et al. | 356/5.02 |

* cited by examiner

METHOD AND APPARATUS FOR CONTROLLING TIME OF FLIGHT CONFIDENCE MAP BASED DEPTH NOISE AND DEPTH COVERAGE RANGE

CROSS-REFERENCE TO RELATED APPLICATIONS

This application claims benefit expired of U.S. provisional patent application Ser. Nos. 61/413,235 and 61/413,247 filed Nov. 12, 2010, which are herein incorporated by reference.

BACKGROUND OF THE INVENTION

Field of the Invention

Embodiments of the present invention generally relate to a method and apparatus for controlling Time Of Flight confidence map based depth noise.

Description of the Related Art

Time Of Flight based sensor measures a depth map by measuring a round trip time of pulse modulated LED light from a camera to the target object point. Usually, the depth map's coverage range corresponds to a half length of LED pulse.

As a result, a wrap-around error may occur. In other words, any object beyond the coverage range of Time Of Flight camera is mistreated as close to Time Of Flight sensor. Time Of Flight camera's depth calculation is based on the phase shift of light, which may be repeated for every a half length of LED modulation.

In addition, in Time Of Flight based depth map, the coverage range physically depends on LED modulation frequency. For example, 20 Mhz LED pulse modulation covers a depth range of 7.5 meter, 100 Mhz LED covers 1.5 meter depth range. Different coverage ranges are targeted depending on vision applications. Some vision application, such as, video conference requires 1.5 meters to 2 meter depth map coverage range. The higher is the LED pulse modulation frequency, the more expensive is the cost of TOF parts and the more difficult is having a stable LED pulse modulation status, even though higher LED pulse modulation allows more fine grained precision in depth map resolution.

Time Of Flight based sensor measures a depth map by measuring a round trip time of pulse modulated LED light from a camera to the target object point. Therefore, theoretically, the depth map's coverage range corresponds to a half length of LED pulse. However, the problem is an aliasing error. In other words, any object beyond the coverage range of Time Of Flight camera is mistreated rather as close to TOF sensor. It's because Time Of Flight camera's depth calculation is based on the phase shift of light. This problem is repeated for every a half length of LED modulation. Specifically, in an automobile vision application, Time Of Flight depth map aliasing error can generate significant vision system mal-function.

Therefore, there is a need for a method and/or apparatus for controlling Time Of Flight depth map.

SUMMARY OF THE INVENTION

Embodiments of the present invention relate to a method and apparatus for fixing a depth map wrap-around error by a confidence map. The method includes dynamically determining a threshold for the confidence map threshold based on an ambient light environment, wherein the threshold is reconfigurable depending on LED light strength distribution in TOF sensor, extracting, via the digital processor, four phases of Time Of Flight raw data from the Time Of Flight sensor data, computing a phase differential signal array for fixed point utilizing the four phases of the Time Of Flight raw data, computing the depth map, confidence map and the average light signal strength utilizing the phase differential signal array, obtaining the dynamic confidence map threshold for wrap around error correction utilizing the average light signal strength, and correcting the depth map wrap-around error utilizing the depth map, the confidence map and the dynamic confidence map threshold.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

We propose using a confidence map to control these problems. Confidence map can be built by measuring the strength of sensor data captured. This confidence map can be obtained as a by-product while computing depth map without extra computation cycles. Ultimately, the confidence map has the information of the captured LED light's signal strength.

Figure 1:
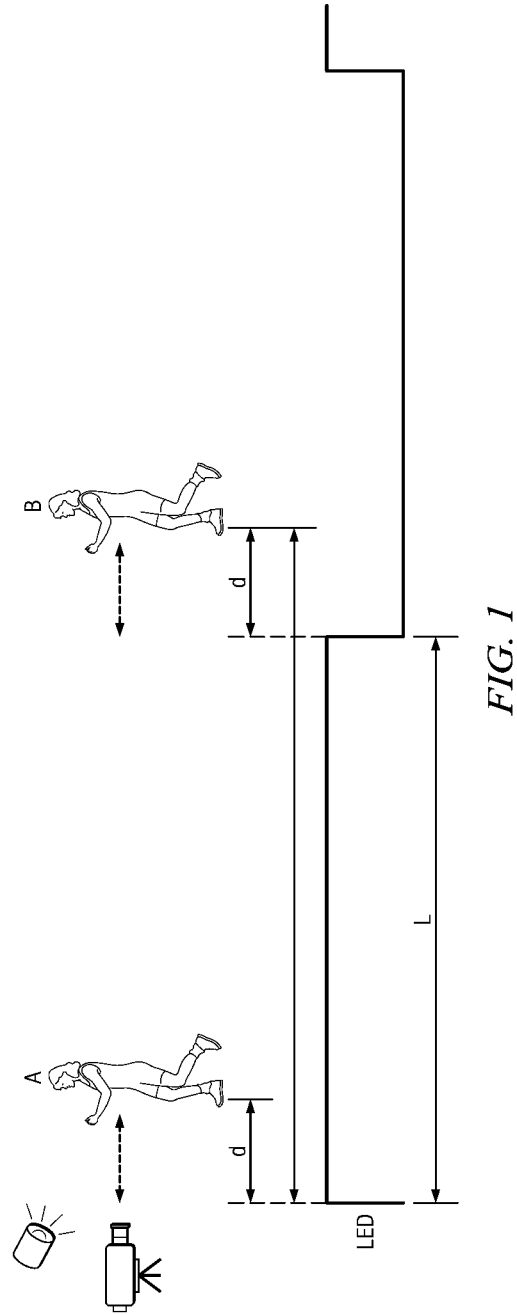
FIG. 1 is an embodiment of a Time of Flight sensor wrap-around error and depth map aliasing error.

FIG. 1 is an embodiment of a Time of Flight sensor wrap-around error. FIG. 1 shows a wrap-around error problem. Here, object "A" and object "B" are placed each "d" distance and "L+d" distance away from TOF sensor. Here, "L" is a half of LED pulse width. However, in a phase shift based TOF sensor depth map calculation, "A" and "B" are considered the same distance from TOF sensor. This problem repeats for every "L" distance.

However, even if a phase shift of "A" and "B" are same, each "A" and "B" has different light signal strength because a reflected light from object "A" close to LED source will be more stronger than "B".

Figure 2:
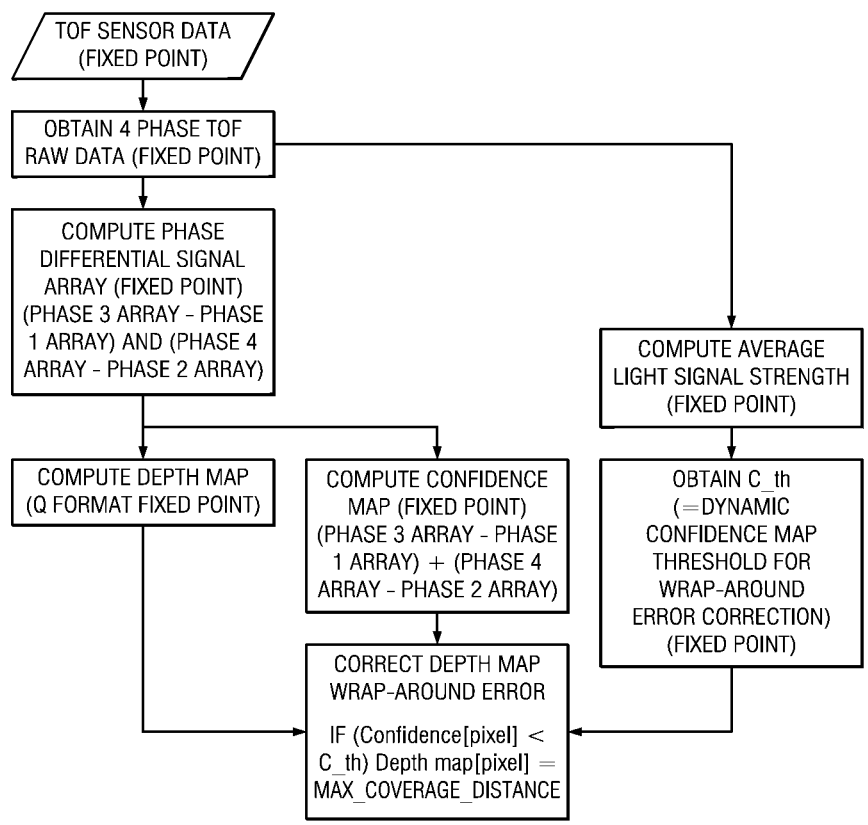
FIG. 2 is an embodiment of a flow diagram depicting a method for confidence map based wrap-around error correction.

FIG. 2 is an embodiment of a flow diagram depicting a method for a confidence map based wrap-around error correction. FIG. 2 depicts fixing a depth map wrap-around error by a confidence map. Here, a confidence map threshold is dynamically determined based on an ambient light environment and is reconfigurable depending on LED light strength distribution in TOF sensor. In FIG. 2, the 4 phases of TOF raw data are extracted from the TOF sensor data. The 4 phases of TOF raw data are utilized to compute phase differential signal array for fixed point, such as, phase 3 array-phase 1 array and phase 4 array-phase 2 array. The phase differential signal array is used to compute the depth map and confidence map. The 4 phases of TOF raw data are utilized to compute the average light signal strength, which is used to obtain the dynamic confidence map threshold for wrap around error correction. Finally, the depth map wrap-around error is corrected utilizing the depth map, the confidence map and the dynamic confidence map threshold. The outcome is a low cost and simple way to solve TOF wrap-around problem without computation overhead and an increase in the reliability of TOF depth map data array.

The error correction is inaccurate due to change of reflection from different objects. Existing solutions use physical change of LED pulse modulation with costly parts for a high frequency LED pulse modulation for each interested depth map coverage range. Objects close to TOF sensor have more reflected lights captured than objects away. In one embodiment, changing a noise level threshold of confidence map data reduces the depth map coverage without applying high frequency LED pulse modulation.

Figure 3:
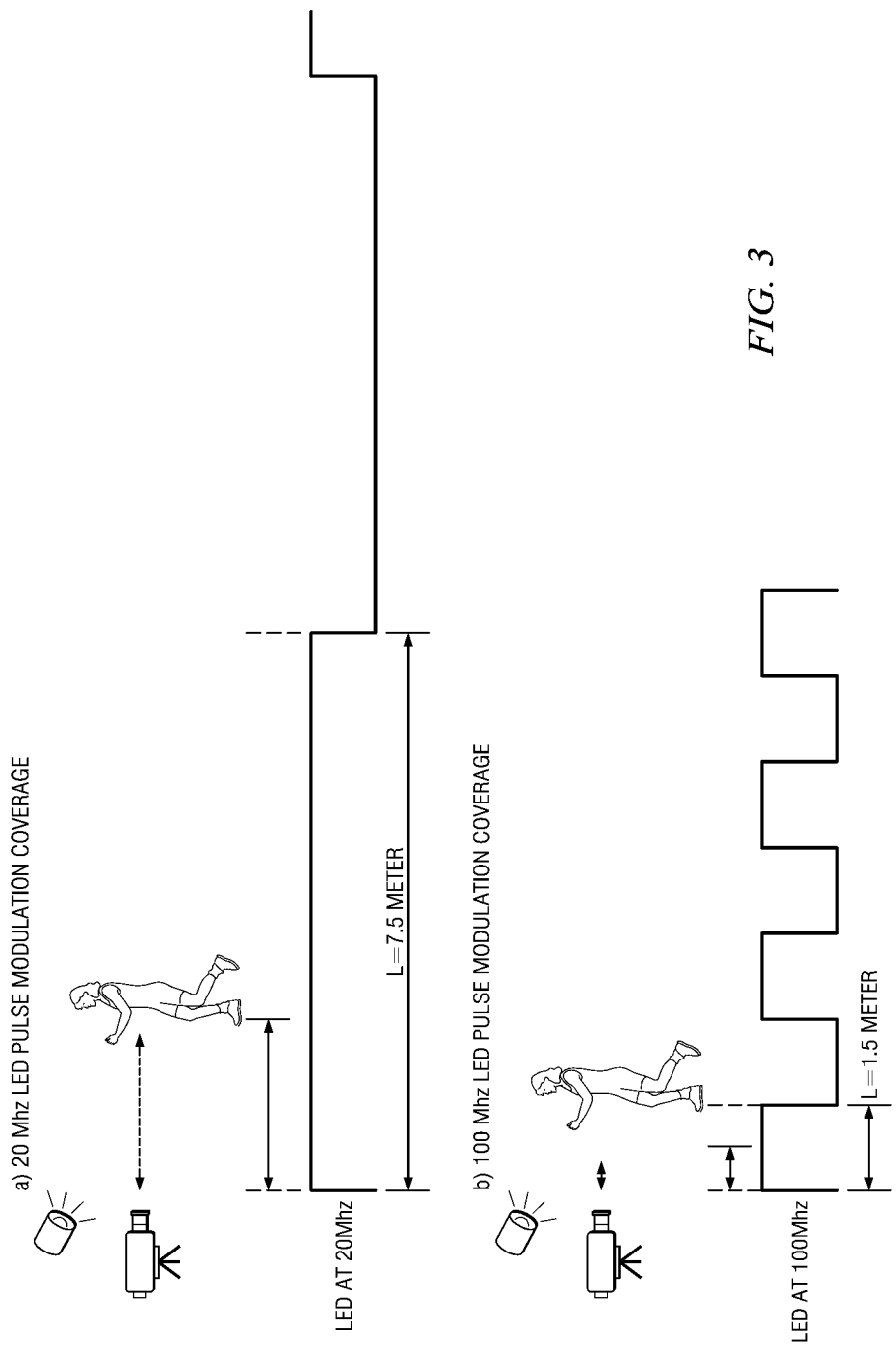
FIG. 3 is an embodiment of a Time of Flight depth map coverage range comparison depending on LED pulse frequency.
Figure 4:
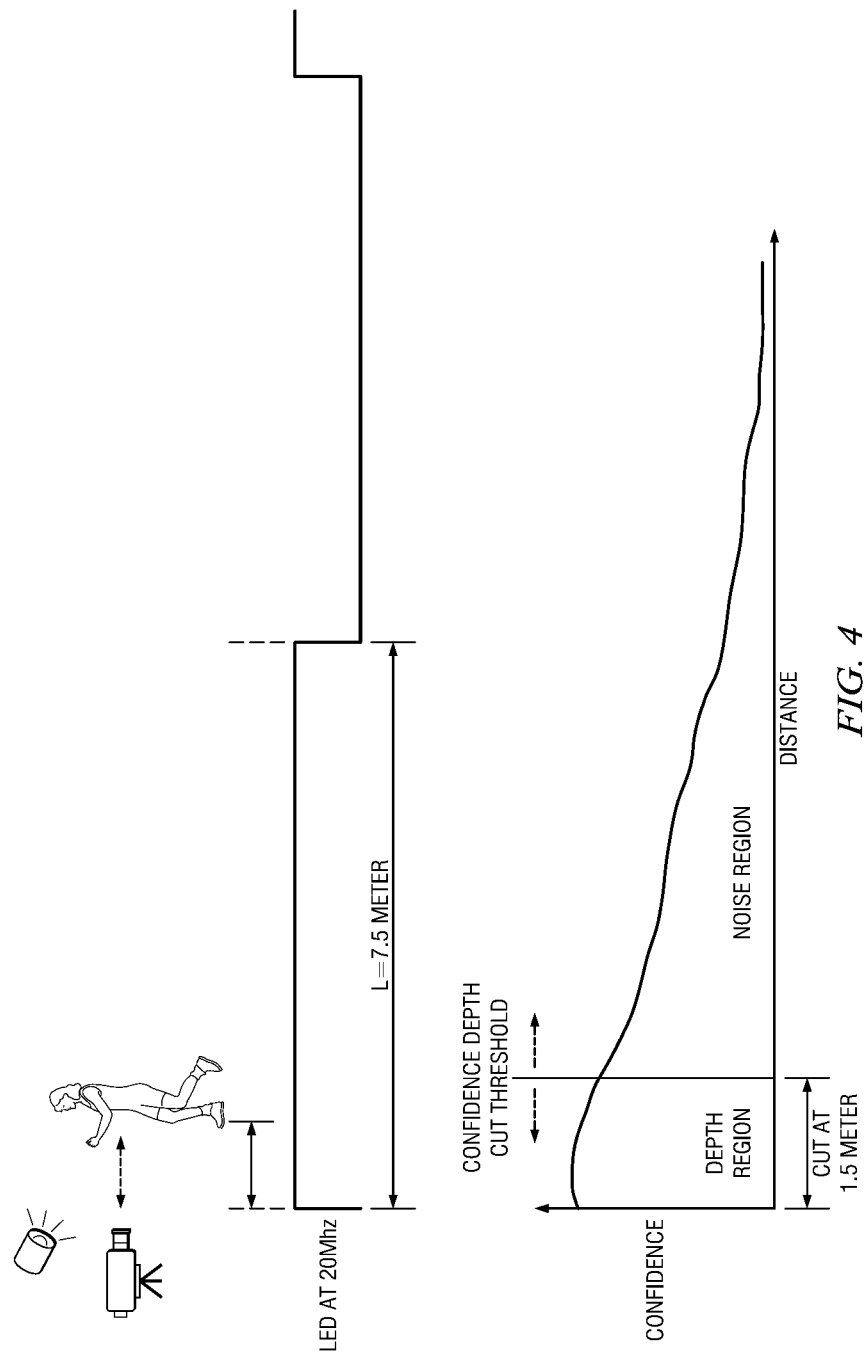
FIG. 4 is an embodiment of a confidence controlled depth region coverage control.

FIG. 3 is an embodiment of a Time of Flight depth map coverage range comparison depending on LED pulse frequency. FIG. 3 depicts the change in depth map coverage depending on LED pulse modulation frequency. FIG. 4 is an embodiment of a confidence controlled depth region coverage control. FIG. 4 depicts utilizing confidence value threshold to determine a depth map coverage boundary. By changing a threshold of a confidence for depth region, various depth map coverage region can be supported without applying physically different LED modulations and associated costly parts.

Figure 5:
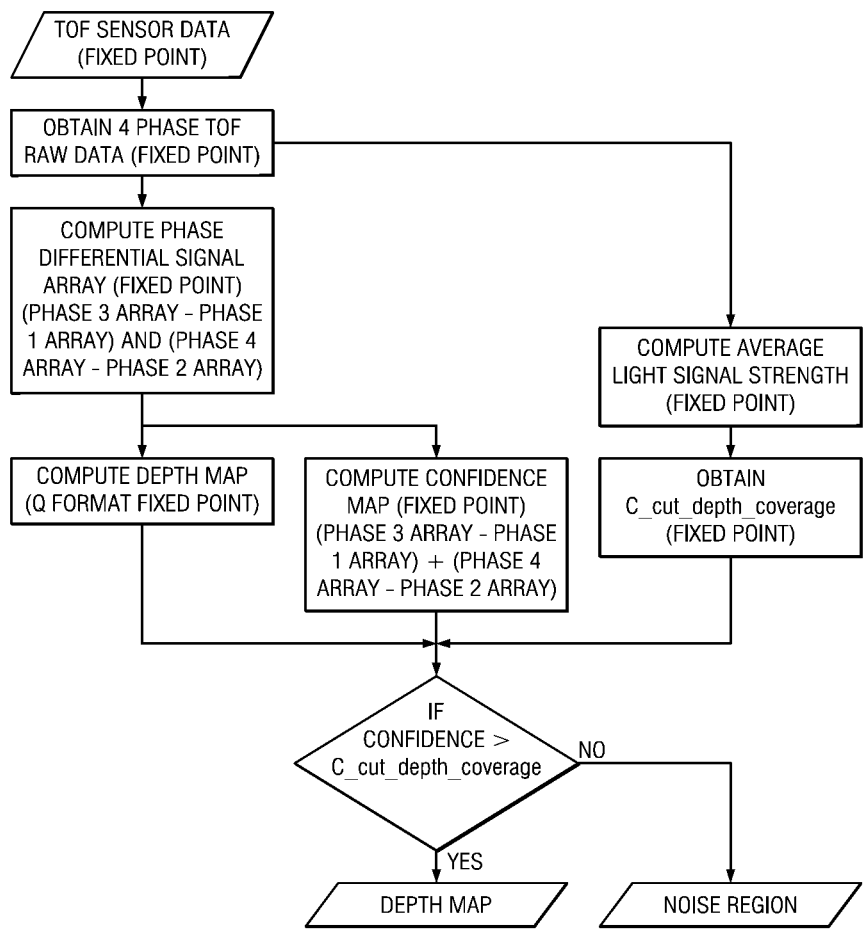
FIG. 5 is an embodiment of a flow diagram depicting a method for a Time Of Flight confidence map based depth map coverage control and method.

FIG. 5 is an embodiment of a flow diagram depicting a method for a Time Of Flight confidence map based depth map coverage control and method. In FIG. 5, the 4 phases of TOF raw data are extracted from the TOF sensor data. The 4 phases of TOF raw data are utilized to compute phase differential signal array for fixed point, such as, phase 3 array-phase 1 array and phase 4 array-phase 2 array. The phase differential signal array is used to compute the depth map and confidence map. The 4 phases of TOF raw data are utilized to compute the average light signal strength, which is used to obtain the cut depth coverage. Finally, if the computed confidence is greater than the cut depth coverage, then the depth map is corrected; otherwise, the region is considered as noise region.

In one embodiment, a confidence map statistics data base depending on distance from TOF camera is used to detect TOF depth map aliasing error. Confidence map can be built by measuring the strength of sensor data captured. This confidence map can be obtained as a by-product while computing depth map without extra computation cycles. Ultimately, the confidence map has the information of the LED light's signal strength.

Confidence map statistics data base may be obtained off-line in various light environments. This confidence map statistics has an average light strength in association with distance distribution from TOF camera in conjunction with various light illumination environment. This confidence statistics information is used to verify any aliasing problem at real-runtime depth map calculation.

For example, as shown in FIG. 1, an aliasing error problem in TOF based distance measurement. In FIG. 1, object "A" and object "B" are placed each "d" distance and "L+d" distance away from TOF sensor. "L" is a half of LED pulse width. However, in a phase shift based TOF sensor depth map calculation, "A" and "B" are considered the same distance from TOF sensor. This problem repeats for every "L" distance.

It should be noted that even if a phase shift of "A" and "B" are same, each "A" and "B" has different light signal strength because a reflected light from object "A" close to LED source will be more stronger than "B". This confidence map measured at real-time depth map calculation is verified against pre-computed confidence map data base. Depending on interested target objects, target objects' data base is combined with confidence map statistics data base to provide more robust depth map anti-aliasing method.

For example, in case human gestures are mainly interested in a depth map, human object feature vector data base is applied combined with confidence map information. This approach can be extended to more aliasing weak environment, such as, an automobile vision application where target objects have more diverse and more dynamic change of light illuminations in a deeper field of view and the likes.

Figure 6:
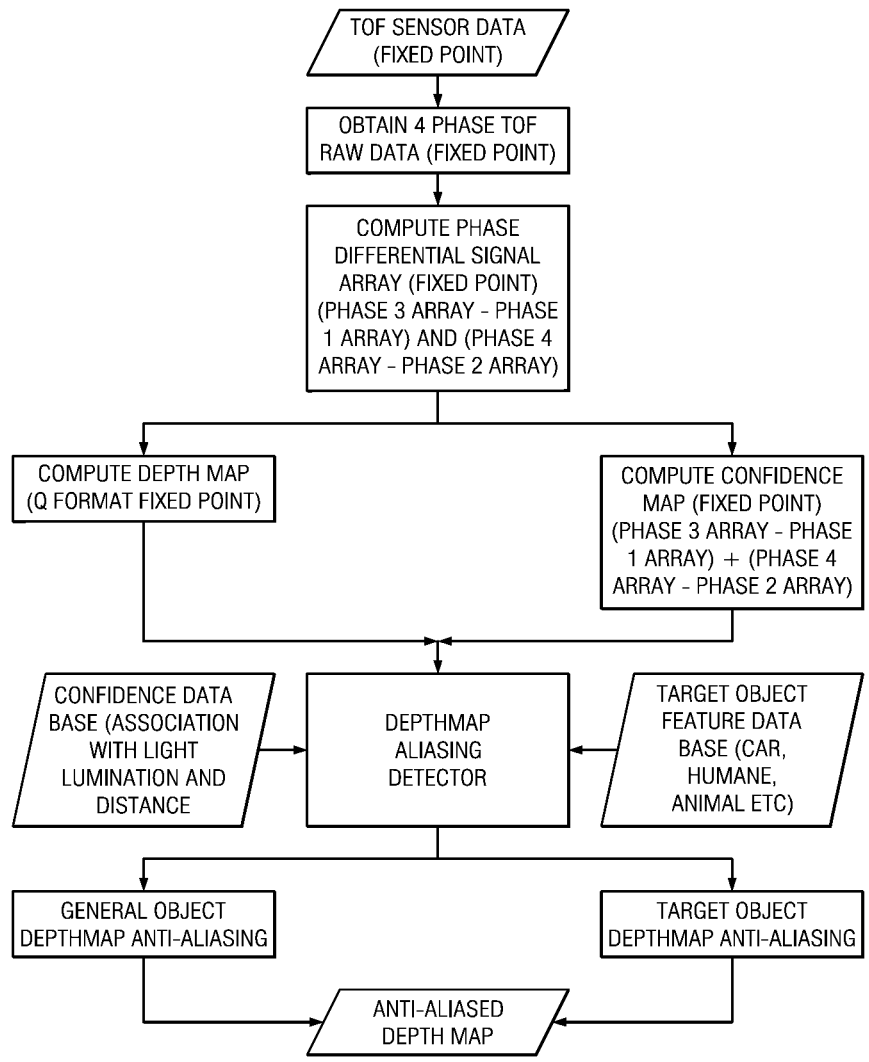
FIG. 6 is an embodiment of a flow diagram depicting a method for correcting an aliasing depth map error by a confidence map.

FIG. 6 is an embodiment of a flow diagram depicting a method for correcting an aliasing depth map error by a confidence map. The four (4) phases of TOF raw data may be obtained from the TOF sensor data and utilized to compute the phase differential signal array. The depth and confidence maps are calculated utilizing the computed phase differential signal array. Then, using the depth and confidence maps, the confidence data base associated with light illumination and distance, and the target object feature data base, the depth map aliasing can be detected. When the depth map aliasing is detected, it can be corrected by anti-aliasing depth map. Such an embodiment would facilitate for a low cost and simple way to solve TOF wrap-around problem without computation overhead and for increasing the reliability of TOF depth map data array.

While the foregoing is directed to embodiments of the present invention, other and further embodiments of the invention may be devised without departing from the basic scope thereof, and the scope thereof is determined by the claims that follow.

What is claimed is:

1. A method comprising:
   determining, via a processor, a confidence map threshold for a confidence map based on a light distribution at a time of flight (TOF) sensor;
   extracting, via the processor, four phases of TOF raw data from the TOF sensor;
   computing, via the processor, a phase differential signal array based on the four phases of the TOF raw data;
   computing, via the processor, a depth map, the confidence map, and an average light signal strength based on the phase differential signal array;
   obtaining, via the processor, a wrap-around error threshold for wrap-around error correction based on the average light signal strength;
   correcting, via the processor, a depth map wrap-around error based on the depth map, the confidence map threshold, and the wrap-around error threshold;
   storing the corrected depth map in a storage medium.

2. The method of claim 1 further comprising correcting an aliasing depth map error by the confidence map.

3. A non-transitory storage medium comprising instructions stored thereon which, when executed by a processor cause the processor to:

determine a confidence map threshold for a confidence map based on a light distribution at a time of flight (TOF) sensor;
extract four phases of TOF raw data from the TOF sensor;
compute a phase differential signal array based on the four phases of the TOF raw data;
compute a depth map, the confidence map, and an average light signal strength based on the phase differential signal array;
obtain a wrap-around error threshold for wrap-around error correction based on the average light signal strength;
correct a depth map wrap-around error based on the depth map, the confidence map threshold, and the wrap-around error threshold; and
store the corrected depth map in a storage medium.

4. The non-transitory storage medium of claim 2 wherein the instructions further cause the processor to correct an aliasing depth map error by the confidence map.

5. An apparatus for fixing a depth map wrap-around error by a confidence map, comprising:
means for determining a confidence map threshold for the confidence map based on a light distribution at a time of flight (TOF) sensor;
means for extracting four phases of TOF raw data from the TOF sensor;
means for computing a phase differential signal array for a fixed point based on the four phases of the TOF raw data;
means for computing a depth map, the confidence map, and an average light signal strength based on the phase differential signal array;
means for obtaining a wrap-around error threshold for wrap-around error correction utilizing the average light signal strength; and
means for correcting the depth map wrap-around error utilizing the depth map, the confidence map threshold, and the wrap-around error threshold; and
memory for storing the corrected depth map.

6. The method of claim 5 further comprising means for correcting an aliasing depth map error by the confidence map.

7. A device comprising one or more processors configured to:
determine a confidence map threshold for a confidence map based on a light distribution at a time of flight (TOF) sensor;
extract four phases of TOF raw data from the TOF sensor;
compute a phase differential signal array for a fixed point based on four phases of the TOF raw data;
compute a depth map, the confidence map, and an average light signal strength based on the phase differential signal array;
obtain a wrap-around error threshold for wrap-around error correction based on the average light signal strength;
correct the depth map wrap-around error based on the depth map, the confidence map threshold, and the wrap-around error threshold.

* * * * *